Figure 1:
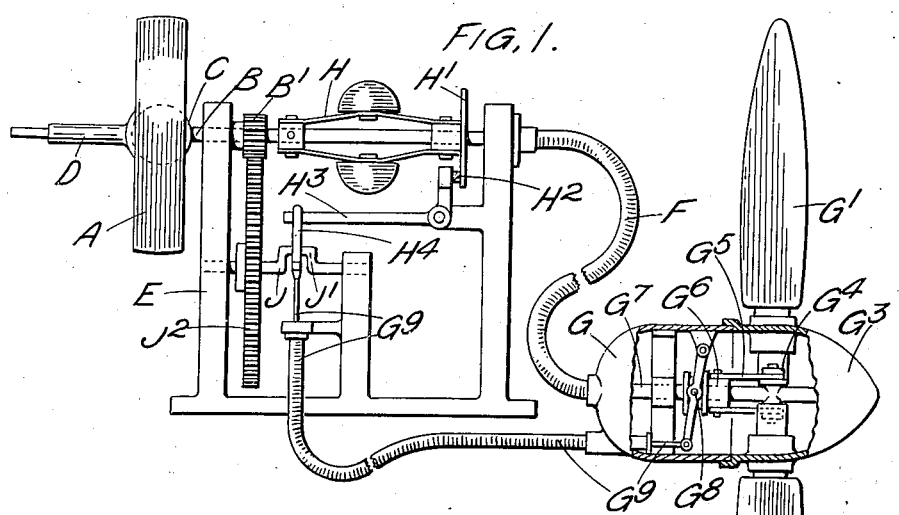

Oct. 2, 1934.　　　J. P. BROWN　　　1,975,740
GYROSCOPIC APPARATUS
Filed Dec. 29, 1933　　　3 Sheets-Sheet 1

Inventor,
J. P. Brown.
Per,
Blair & Kilcoyne
Att'y.

Inventor,
J. P. Brown,
per
Blair & Kilcoyne, Attys.

Oct. 2, 1934.  J. P. BROWN  1,975,740
GYROSCOPIC APPARATUS
Filed Dec. 29, 1933  3 Sheets—Sheet 3

Inventor,
J. P. Brown.

Patented Oct. 2, 1934

1,975,740

UNITED STATES PATENT OFFICE 1,975,740

GYROSCOPIC APPARATUS

John Pollock Brown, London, England, assignor to P. B. Deviator Limited, London, England, a company of Great Britain Application December 29, 1933, Serial No. 704,541
In Great Britain September 26, 1932

17 Claims. (Cl. 74—5)

This invention relates to gyroscopic apparatus and in particular to such apparatus for deflection indicating and/or controlling devices.

The type of gyroscopic apparatus with which this invention is concerned is that comprising a rotatable spindle suitably driven by some form of motor and presenting a part-spherical bearing surface having its centre on the axis of rotation, and a rotor presenting one or more cooperating part-spherical surfaces by which it is mounted on the spindle so as to be substantially balanced about the centre of the said surfaces.

A deflection or deviation indicator embodying gyroscopic apparatus of this type is described in the present applicant's United States of America Patent No. 1,860,230. The indicator described is provided with means such as vanes to retard the rotor and cause slip to occur between the cooperating part-spherical surfaces about their axis of rotation thus preventing sticking and ensuring them freedom of relative movement about transverse axes.

One object of the present invention is to provide an improved device of the type specified in which an alternative method of obtaining the desired slip is employed.

Another object of the invention is to make use of the slip in such a way as to reduce still further the tendency of the gyroscope rotor to shift its orientation in space when the spindle does so.

According to this invention gyroscopic apparatus of the type specified comprises means for automatically varying the speed at which the spindle rotates, in order to produce the desired slip between the part-spherical surfaces. The speed of the spindle may either be maintained always above a certain minimum value or it may vary between zero and its maximum for example being alternately started and stopped.

In gyroscopic apparatus of the type specified if the spindle and rotor are rotating together but are out of alignment the friction between the part-spherical surfaces produces a couple tending to cause precession of the gyro rotor into alignment with the spindle. Where slip is caused to occur by ensuring a difference in speed between the rotor and its spindle the couple tending to cause precession will only be a component of the total frictional couple between the part-spherical surfaces. The proportion of the total frictional couple which operates to cause precession of the gyro rotor will depend upon the ratio of the speed of the spindle to the difference of speeds between the spindle and the rotor. Thus where there is no difference of speed between the spindle and rotor the whole frictional couple will be in a direction tending to cause precession. On the other hand where the speed of the spindle is zero there will be no frictional couple tending to cause precession of the gyro rotor.

Thus when the spindle is stationary, while the rotor continues to rotate, it will remain in its original position following a deflection of the spindle until such time as rotation of the spindle starts again so as to once more speed up the rotor when the latter will gradually return to its normal position.

Hence according to one form of the invention gyroscopic apparatus of the type specified comprises means for automatically rendering the motor temporarily inoperative or ineffective to drive the spindle and preferably for intermittently stopping rotation of the spindle altogether and restarting it.

The speed variations of the spindle should be such and of such duration that the rotor is not slowed down below the minimum speed at which it operates efficiently as a gyroscope.

Figure 2:
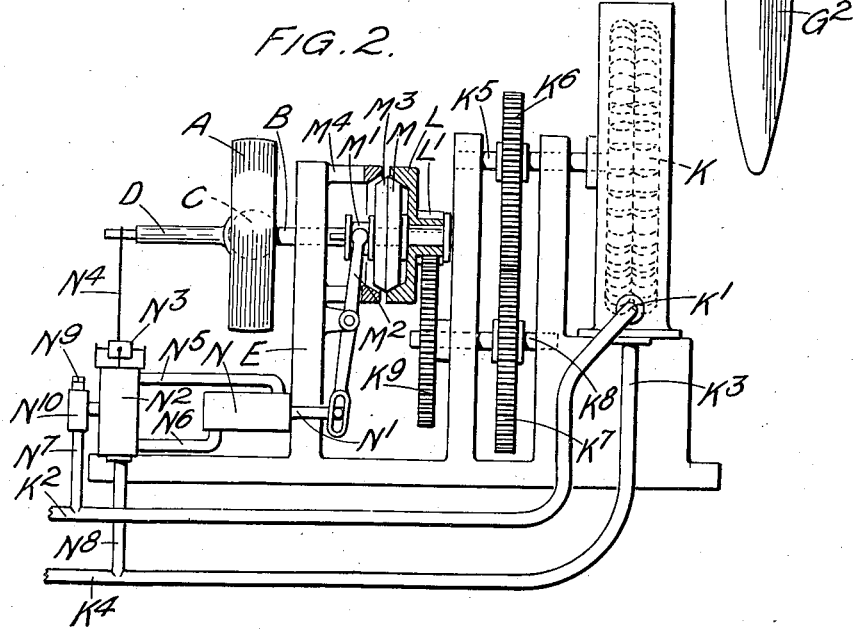
Figure 3:
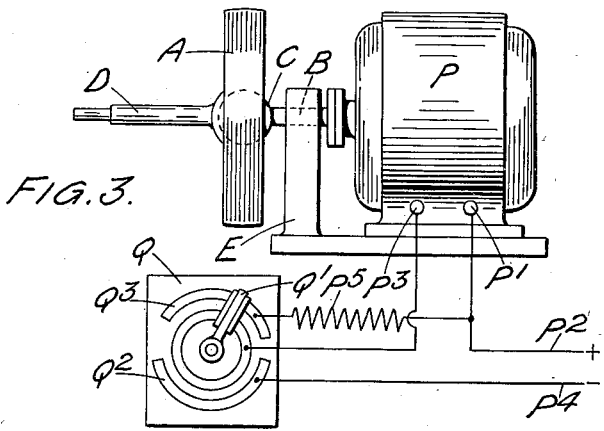
Figure 4:
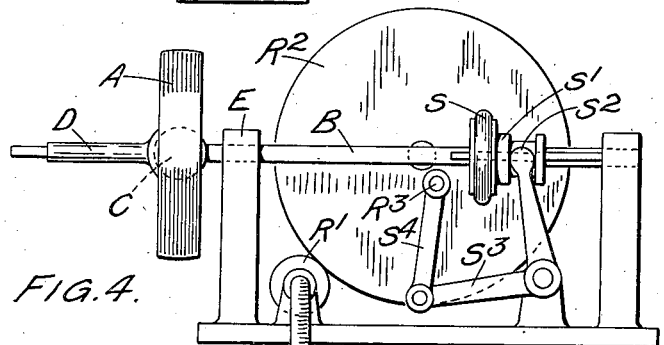
Figure 5:
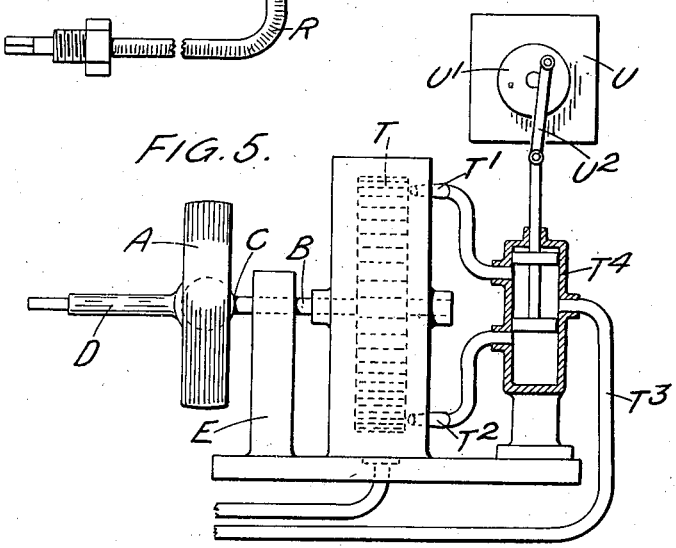

Figure 1 shows an arrangement employing a pneumatically operated motor and a governor, Figure 2 shows an arrangement employing a hydraulic turbine acting through eccentric gearing and a clutch and brake controlled by deflection of the rotor, Figure 3 shows an arrangement employing an electric motor controlled by a clock mechanism, Figure 4 shows an arrangement employing a variable speed gear operated by a crank driven by the driving means of the spindle, and Figure 5 shows an arrangement employing a hydraulic turbine with the supply of fluid controlled by a clock.

Figure 6:
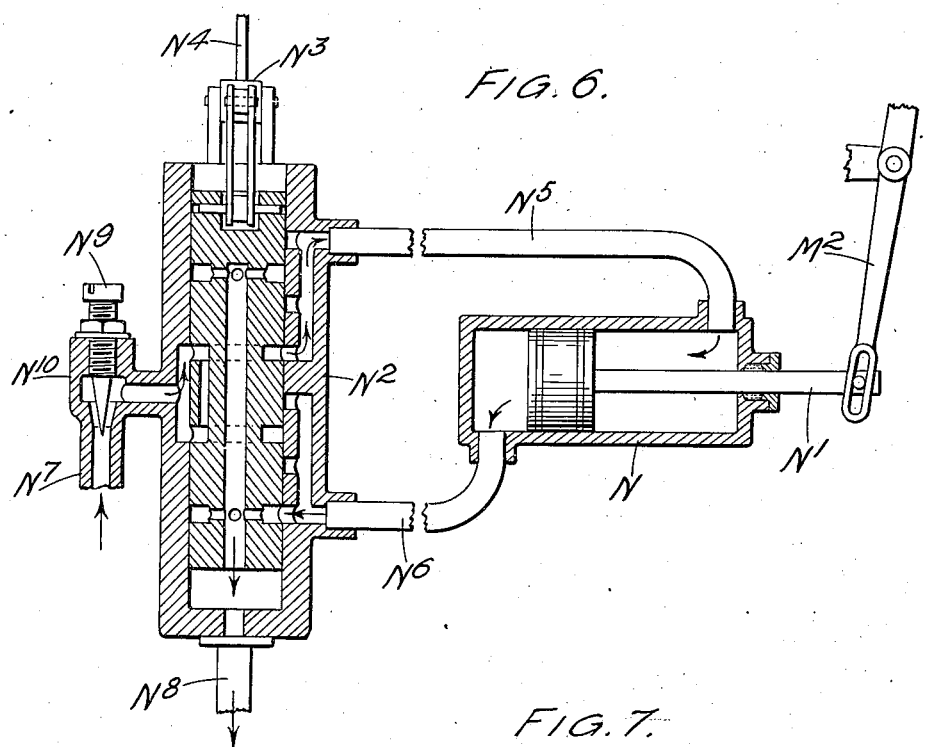
Figure 7:
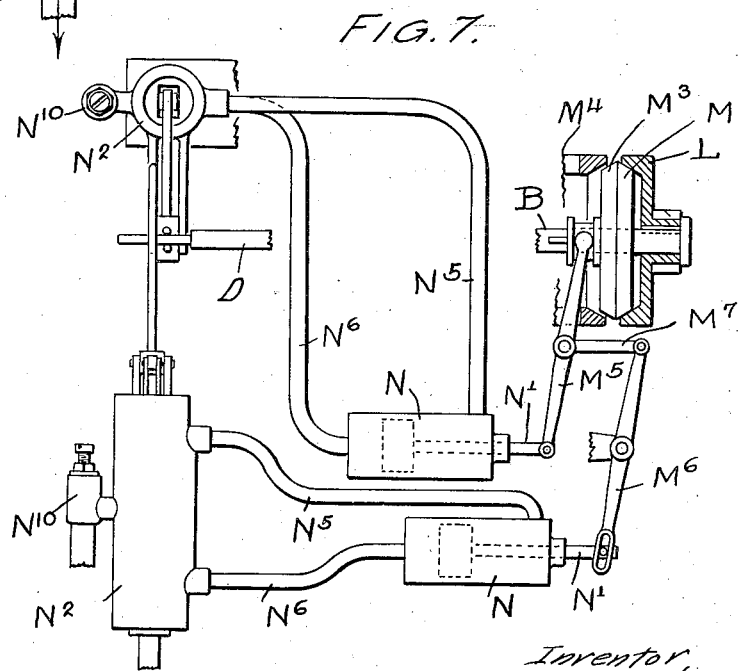

Figure 6 shows in diagrammatic section a portion of the device shown in Figure 2 on an enlarged scale, and Figure 7 shows a modified arrangement of certain of the parts shown in Figure 2.

The gyro rotor may be constructed substantially in accordance with United States of America Patent No. 1,860,230 and briefly comprises a flywheel indicated diagrammatically at A mounted on a spindle B. The spindle B has a ball-shaped end C which cooperates with a corresponding surface in the rotor hub to form a ball joint about which the rotor can turn in any direction. From the side of the rotor remote from the spindle an axial pin D extends. This will be furnished with a pointer when the device is to be used as a deflection indicator and, when the device is to be used for controlling purposes, this will be arranged to operate the control apparatus, for example through servo mechanism. The device as a whole is in each case shown diagrammatically as mounted on a frame E.

In the prior patent referred to the rotor A was provided with vanes to retard it and cause slip between the surfaces of the ball joint in the direction of rotation. In the present case slip is effected by varying the speed of rotation of the spindle B.

In the arrangement shown in Figure 1 the spindle is indicated diagrammatically as driven through a flexible drive F from a wind motor G.

On the shaft B is mounted a centrifugal governor H having a brake disc $H^1$ cooperating with a brake $H^2$. The brake $H^2$ is shown diagrammatically as carried by one arm of a bell crank of which the other arm $H^3$ is connected by a connecting rod $H^4$ to a crank $J^1$ on a spindle J.

The spindle J carries a large gear wheel $J^2$ by which it is driven from a pinion $B^1$ on the spindle B. Hence the speed to which the governor is adjusted varies between predetermined upper and lower limits every few revolutions of the spindle B. Although in this case the speed of the motor is made to vary at the same time the period of variation of the speed will remain uniform.

In order to assist the governor and prevent excessive liberation of energy at the brake $H^2$, the wind motor G is of variable pitch type. It is shown diagrammatically as comprising a pair of blades $G^1$ and $G^2$ rotatably mounted in a hub $G^3$. Each blade is provided with an arm $G^4$ connected by a link $G^5$ to a sleeve $G^6$ which is capable of sliding longitudinally on the spindle $G^7$ of the motor. For sliding the sleeve $G^6$ longitudinally and thereby altering the pitch of the blades a forked arm $G^8$ is provided which is connected by means of a Bowden wire $G^9$ to the crank $J^1$. Thus the pitch of the blades of the wind motor is varied in synchronism with the adjustment of the governor.

It will be appreciated that either the variable pitch wind motor or the variable speed governor could be employed independently of one another.

Figure 2 indicates diagrammatically an arrangement in which a small hydraulic turbine such as a Pelton wheel K is employed as the driving means. The turbine comprises a nozzle $K^1$ to which oil or other fluid under pressure is supplied from a source of pressure fluid $K^2$. The fluid returns by a drain pipe $K^3$ to a relief passage $K^4$. The spindle $K^5$ of the Pelton wheel carries one of a pair of eccentric gears $K^6$ and $K^7$ of which the other is mounted on a spindle $K^8$. Thus at one stage of its revolution the gear $K^6$ is rotating faster than the gear $K^7$ while at another stage of its revolution it is rotating more slowly so that if the Pelton wheel rotates at a constant speed the speed of the shaft $K^8$ will vary.

The shaft $K^8$ carries a gear wheel $K^9$ which meshes with a pinion $L^1$ secured to a clutch member L mounted freely on the shaft B. The clutch member L drives a cooperating clutch cone M splined on the shaft B and provided with an extension sleeve $M^1$ having an annular groove in which the forked end of a lever $M^2$ engages. Thus movement of the lever shifts the clutch cone M longitudinally in order to engage or disengage the clutch.

The clutch cone M is formed with a conical braking surface $M^3$ to cooperate with fixed brake shoes $M^4$ carried by the frame. Thus when the clutch is disengaged a positive braking torque is applied to it to stop the spindle B from rotating.

The operation of the clutch and brake is effected by servo mechanism controlled by deviation of the rotor axis relative to that of the spindle. For this purpose the lower end of the lever $M^2$ is connected to the piston rod $N^1$ of a servo motor N. The servo motor is controlled by a valve $N^2$ represented as a piston valve of which the piston is connected to one arm of a bell crank $N^3$ of which the other arm is a fork shaped member $N^4$ of which the limbs project upwardly on opposite sides of the axial pin D of the rotor.

Figure 6 shows the piston valve arranged in accordance with well known principles and having four circumferential grooves cooperating with ports to perform the desired functions. Thus the top and bottom grooves are connected to the relief pipe $N^8$ while the middle grooves are connected to the pressure pipe $N^7$. The pipe $N^5$ has three ports cooperating with the upper two grooves. The lowest of these ports registers with the pressure groove when the piston is central and is otherwise cut-off while the upper two ports are situated one above and one below the relief groove so that the latter is cut-off when the piston is central but registers with one or other of them when the piston is moved a predetermined amount up or down. Similarly the pipe $N^6$ has three ports cooperating with the lower two grooves. In this case the lowest port registers with the relief groove when the piston is central and is otherwise cut-off. The upper two ports are arranged one above and one below the pressure groove so that the latter is cut-off when the piston is central but registers with one or the other of them when the piston is moved a predetermined amount up or down. Thus as the rotor moves laterally about a vertical axis the fork $N^4$ will be moved to and fro and the piston valve will be moved up and down. The piston valve is connected by pipes $N^5$ and $N^6$ to the servo motor and by pipes $N^7$ and $N^8$ to the source of pressure fluid $K^2$ and relief passage $K^4$ respectively.

It will be appreciated that the employment of a hydraulic motor in the arrangement described is particularly convenient inasmuch as a source of liquid under pressure is required for the operation of the servo mechanism. Where the apparatus is installed in an aircraft for example the liquid may be derived directly from the means for supplying lubricant under pressure to the engine.

The pipe $N^7$ communicates with the valve $N^2$ through a throttling device $N^{10}$ provided with an adjusting screw $N^9$ so that the speed of operation of the servo mechanism can be adjusted to suit requirements. Thus owing to the eccentric gears $K^6$ and $K^7$ the speed of the spindle B will be continually varying so that there will be substantially continuous slip between the surfaces of the ball joint of the rotor. Thus when a deviation occurs and the orientation of the spindle in space alters there will be only a very small tendency for the rotor to shift out of its existing orientation in space. If however the spindle remains for a substantial time in its new orientation the rotor (apart from the servo mechanism) would tend to drift into alignment with the spindle. This is prevented in the present arrangement by the servo mechanism which disengages the clutch M and applies the brake $M^3$ thereby stopping the spindle. The surfaces of the ball joint will be lubricated as well as possible so that the spindle can be stopped for a considerable period without the rotor slowing down to such an extent as to impair its efficiency as a gyroscope.

By adjusting the screw $N^9$ of the throttling device $N^{10}$ and the lap of the piston valve $N^2$ the servo mechanism can be prevented from stopping the spindle except when the deviation is substantial and persists for a substantial period. The arrangement has been described as controlled by deviation about a vertical axis but it will be appreciated that it may also be operated by deviation about a horizontal axis whether transverse or fore and aft, or by a combination of these.

For operation by deviation about a horizontal axis all that is necessary is to turn the apparatus as a whole, or alternatively the valve $N^2$, on its side. For operation by deviation about either a horizontal or a vertical axis two similar valves $N^2$ and two similar servo motors N each controlled by one of the valves may be provided. Figure 7 shows such an arrangement in which one of the valves is turned on its side and one of the levers $M^5$ instead of being mounted on a fixed pivot is connected by link $M^7$ to the other end of the other arm by lever $M^6$ so that operation of either servo motor will disengage the clutch $M^3$ and apply the brake.

Figure 3 shows diagrammatically a simple arrangement in which the rotor is driven directly by means of an electric motor P. One terminal $P^1$ of the motor is connected directly to one supply main $P^2$ while the other terminal $P^3$ is connected to a rotating contact arm $Q^1$ which is continuously rotated by means of a clock mechanism Q. The arm $Q^1$ cooperates with a pair of arcuate contacts $Q^2$ and $Q^3$ of which the contact $Q^2$ is connected to the other supply main $P^4$. The contact $Q^3$ is connected through a resistance $P^5$ to the supply main $P^2$. Thus when the arm $Q^1$ is on the contact $Q^2$ the motor is connected directly across the mains while when it is on the contact $Q^3$ the motor is disconnected from the mains and has the resistance $P^5$ connected across it so that it serves as a generator and is slowed down. Retardation of the motor and spindle can be varied by varying the value of the resistance $P^5$. Moreover the relative duration of the periods during which the motor is energized, running freely, and retarded can be altered as may be desired by altering the relative circumferential lengths of the contacts $Q^2$ and $Q^3$ and the spaces between them.

Figure 4 shows diagrammatically an arrangement in which variable ratio transmission mechanism is employed. In this case a flexible drive R is employed which is adapted to be connected for example to the internal combustion engine which drives an aircraft. The drive operates on a pinion $R^1$ which meshes with a large gear wheel $R^2$. The face of the gear wheel is flat and the shaft B of the rotor has splined on it a friction wheel S provided with a grooved sleeve $S^1$ arranged to be moved longitudinally by the forked arm $S^2$ of a bell crank. The other arm $S^3$ of this bell crank is connected by a connecting rod $S^4$ to a crank pin $R^3$ on the gear wheel $R^2$ which oscillates the bell crank $S^2 S^3$ and therefore moves the friction wheel periodically towards and away from the centre of the face of the wheel $R^2$.

It will be appreciated that Figure 4 like the remainder of the drawings is purely diagrammatic and any preferred form of variable gear may be employed.

Figure 5 shows diagrammatically an arrangement in which a hydraulic turbine T is employed coupled directly to the rotor shaft B. The turbine is provided with a pair of nozzles $T^1$ and $T^2$ directed so as to tend to drive it in opposite directions and fluid under pressure is distributed to the nozzles from a source $T^3$ through a piston valve $T^4$. The piston valve is moved periodically up and down by means of a clock U driving a crank $U^1$ to which it is connected by a connecting rod $U^2$. Preferably the lap of the valve is made very small or a snap-over mechanism is incorporated in the clock so that when the fluid is cut off from the nozzle $T^2$ it will promptly be supplied to the jet $T^1$ in order that the slip at the ball-joint surfaces of the rotor may be substantially continuous. The fact that the turbine T will be of low efficiency will be immaterial as the power required to drive the rotor will be small. It will be appreciated that the turbine must be driven more powerfully or for longer periods in one direction than in the opposite direction either by making one of the jets $T^1$ and $T^2$ more efficient or powerful than the other or by admitting liquid to one of them for a longer period.

What I claim as my invention and desire to secure by Letters Patent is:—

1. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and means for automatically varying the speed at which the spindle rotates, in order to produce slip between the part-spherical surfaces.

2. Gyroscopic apparatus comprising in combination a rotatable spindle presenting at least one part-spherical bearing surface, a rotor presenting a cooperating part-spherical surface by which it is mounted on said spindle so as to be substantially balanced about the centre of said surfaces, driving means to rotate the spindle and means for automatically rendering the driving means temporarily ineffective to drive the spindle, in order to produce slip between the part-spherical surfaces.

3. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and automatic means for intermittently stopping and restarting rotation of said spindle.

4. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, and means for driving the spindle at a speed which automatically varies periodically at timed intervals.

5. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and a device driven by the said driving means for automatically varying the speed at which the spindle rotates, in order to produce slip between the part-spherical surfaces.

6. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and a device driven independently of the said driving means and serving automatically to produce variations in the speed of the spindle at regularly timed intervals to produce slip between the part-spherical surfaces.

7. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and a device operated by deflection of the rotor axis relatively to the spindle axis to cause variations in the speed of the spindle to produce slip between the part-spherical surfaces.

8. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and automatic means for intermittently applying to the spindle a retarding torque to reduce its speed and produce slip between the aforesaid surfaces.

9. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and automatic means for intermittently applying to the spindle a retarding torque sufficient to bring it to rest.

10. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and a brake operated automatically for intermittently reducing the speed of the spindle.

11. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle, a clutch interposed between the spindle and said driving means, and means for automatically operating said clutch to produce variations in the speed of the spindle and cause slip between the part-spherical surfaces.

12. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means including a motor to rotate the spindle and means for automatically varying the speed-torque characteristic of the driving motor so as to vary the speed of the spindle and cause slip between the part-spherical surfaces.

13. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle, a variable speed governor therefor, and means for automatically controlling the governor so as to vary the speed of the spindle and cause slip between the part-spherical surfaces.

14. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle and means for temporarily interrupting the supply of motive power to the driving motor automatically to vary the speed of the spindle and cause slip between the part-spherical surfaces.

15. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, and driving means for the spindle including variable-ratio transmission mechanism whereof the speed ratio is varied automatically to vary the speed of the spindle and cause slip between the part-spherical surfaces.

16. Gyroscopic apparatus comprising in combination a rotatable spindle presenting a part-spherical bearing surface, a rotor presenting a cooperating part-spherical surface by which it is mounted on said spindle so as to be substantially balanced above the centre of said surfaces, driving means to rotate the spindle and a device operated by deflection of the rotor axis relatively to the spindle axis to stop rotation of the spindle automatically when such deflection occurs and to restart the spindle automatically when the rotor axis and spindle are restored to alignment.

17. Gyroscopic apparatus comprising in combination a rotatable spindle presenting a part-spherical bearing surface, a rotor presenting a cooperating part-spherical surface by which it is mounted on said spindle so as to be substantially balanced about the centre of said surfaces, driving means to rotate the spindle, a device operated by deflection of the rotor axis relatively to the spindle axis to stop rotation of the spindle automatically when such deflection occurs and to restart the spindle automatically when the rotor axis and spindle are restored to alignment and means for delaying the stopping of the spindle so as to prevent it from occurring as a result of rapid transient deflections.

JOHN POLLOCK BROWN.